United States Patent [19]

Grage et al.

[11] Patent Number: 5,005,083

[45] Date of Patent: Apr. 2, 1991

[54] FLIR SYSTEM WITH TWO OPTICAL CHANNELS FOR OBSERVING A WIDE AND A NARROW FIELD OF VIEW

[75] Inventors: Ludger Grage, Eichenau; Paul Dato, Emmering, both of Fed. Rep. of Germany

[73] Assignee: Siemens Aktiengesellschaft, Berlin and Munich, Fed. Rep. of Germany

[21] Appl. No.: 354,208

[22] Filed: May 19, 1989

[30] Foreign Application Priority Data

May 19, 1988 [DE] Fed. Rep. of Germany ....... 3817159

[51] Int. Cl.⁵ ...................... H04N 5/268; H04N 7/18
[52] U.S. Cl. ..................... 358/181; 358/183; 358/125; 358/105
[58] Field of Search ............. 358/181, 183, 146, 125, 358/113, 105; 250/203 R, 342, 334; 244/3, 16

[56] References Cited

U.S. PATENT DOCUMENTS

| | | | |
|---|---|---|---|
| 3,654,386 | 4/1972 | Baum | 358/146 |
| 3,876,308 | 4/1975 | Alpers | 358/125 |
| 4,034,208 | 7/1977 | Vaeth et al. | 358/125 |
| 4,103,435 | 8/1978 | Herndon | 358/104 |
| 4,199,785 | 4/1980 | McCullough et al. | 358/113 |
| 4,843,459 | 6/1989 | Perrin et al. | 358/108 |

FOREIGN PATENT DOCUMENTS

| | | |
|---|---|---|
| 258803 | 3/1988 | European Pat. Off. . |
| 3146552 | 7/1983 | Fed. Rep. of Germany . |
| 62-17724 | 1/1987 | Japan . |

Primary Examiner—John K. Peng
Attorney, Agent, or Firm—Hill, Van Santen, Steadman & Simpson

[57] ABSTRACT

A scene is recorded simultaneously by two optical channels having different fields of view and different magnifications, whereby a picture detail from the narrow field of view is mixed into the image of the overall scene and the mixed image is portrayed on a single image portrayal device. The picture detail can follow the relative motion of an object on the basis of a tracking event. Higher detail recognition is provided for one person operation at a higher range without loss of the overall portrayal.

19 Claims, 3 Drawing Sheets

FLIR SYSTEM WITH TWO OPTICAL CHANNELS FOR OBSERVING A WIDE AND A NARROW FIELD OF VIEW

BACKGROUND OF THE INVENTION

1. Field of the Invention

The present invention is directed generally to a method for observing a scene including portraying on an image portrayal side an image of the scene acquired with a wide field of view as well as an image of the scene acquired with a narrow field of view, and to an apparatus for implementing the method including an image system having two optical channels with different fields of view on the image pick-up side. The invention is particularly applicable to infrared imaging systems (FLIR).

2. Description of the Related Art

Thermal imaging apparatus are currently frequently used for observing a scene. Although thermal image apparatus may be used during the day, such apparatus are also used at night for locating and observing thermal radiating objects and, in combination with suitable portrayal devices, also is used for flying aid and navigation at night. For observation of a large region in general and particularly for flying aid and navigation at night, it is particularly desirable to be able to both survey the entire scene as well as to recognize details within the overall scene. It is, therefore, expedient to observe the scene with two thermal imaging devices having different magnifications to thereby observe the scene with a first thermal imager and reproduce it at a 1:1 scale, and at direct a second thermal imaging device to an object to be recognized and then switch to a magnified image of the scene. Such methods, however, have the disadvantage that the observer has only the picture of the overall scene or only a detailed picture available.

A method wherein an observer is offered both the image of the overall scene as well as a detailed, or magnified, image is disclosed in German Patent 31 46 552. The disclosed method provides at least two pick-up systems for images that have different imaging scales. Also disclosed is a corresponding plurality of monitors allocated to the respective pick-up systems, whereby a frame symbol whose bounded picture detail corresponds to the magnified image of a first monitor is mixed into the overall image of a second monitor, for example, and whereby the variable frame symbol automatically follows the relative motion of the pick-up systems in height and laterally. An image of the overall scene and a detailed, or magnified, image is thus offered to the observer simultaneously on a plurality of monitors corresponding to the plurality of pick-up systems, i.e. on at least two monitors. The frame symbol mixed into the second monitor makes it possible to recognize what detail the first pick-up system is directed to and where the detailed image of the first monitor lies in the overall scene. The frame symbol that is mixed in is adjusted based on the relative movement of the two pick-up systems relative to one another, the pick-up systems being pivotable relative to one another.

At the image portrayal side, however, the known method requires at least two monitors so, for one person operation, the observer must simultaneously direct her attention to two monitors or must switch her line of sight from one monitor to the other when observing a larger area and when observing and recognizing details within the overall scene. Such a method is therefore not well suited for a one person operation. Moreover, the transmission properties of the apparatus chain up to the eye only allow a limited recognition of details at limited range.

SUMMARY OF THE INVENTION

It is an object of the present invention to simplify observation of a scene for one person operation using two optical channels with different fields of view and thereby improve the detail recognition at a greater range without loosing the required 1:1 scale of the overall scene.

In a method according to the invention, this and other objects are inventively achieved in that image signals, and particularly infrared image signals, of both channels are first converted into TV video signals with the assistance of two converter means and are synchronized to one another with a first synchronization means and then supplied to a video mixing means. One part of the TV video signal of the narrow field of view channel, is selected by a detail selector and is matched into the TV video signal of the wide field of view channel, by the video mixer means. Subsequently, the mixed video signal is made visible on a single image portrayal device or monitor such that an overview scene of the wide field of view channel and a mixed-in picture detail of the narrow field of view channel appears simultaneously in the portrayed image.

The present invention, thus, provides for simultaneous observation of two optical channels having different fields of view and, thus, different magnifications. The invention provides mixing of a picture detail from a narrow field of vision, i.e. from the magnification channel, into the image of the overall scene and, thus, into the 1:1 portrayal thereof, and also provides a simultaneous portrayal of both images with a single image portrayal device. The method provides many advantages for one person observation by offering a single observer both a 1:1 portrayal of the overall scene as well as a detail picture on a single image portrayal device, so that the single observer need only direct his attention to a single image portrayal when observing both a larger area and when observing and recognizing details. In the case of a one person operation, observation is thus considerably simplified and, therefore, the method is particularly well suited for flying aid. For example, only a picture detail of a magnification channel containing, for example, a specific target object is mixed into an image of an overall scene; moreover, a greater detail recognition at a greater range is possible without the necessary orientation of the 1:1 portrayal of the overall scene being lost from the navigation channel.

The method of the invention is useful with particular advantage in sighting and targeting events when the illustrate picture detail of the narrow field of view channel follows the relative movement of an object in the narrow field of view. This is referred to as a tracking event which is carried out with a tracker. The selected (target) object is, thus, continuously fully portrayed for the observer. A follow-up of the picture detail also places the observer in the position to follow the object with the optical axis of the wide field of view channel without loosing it from the field of view.

Further method steps of the invention include generating symbols and superimposing the symbols in the wide field of view for identifying the position of the illustrated picture details. Additional symbols, such as for identifying operating conditions, references axes, range, height, and scene details, may be superimposed in the mixed video signal as well.

In one embodiment, part of the signal from the narrow field of view channel is selected by a detail selector and is mixed into the wide field of view channel so that a picture detail from the narrow field of view appears in a pre-selected region of the image portrayal device. In embodiments utilizing tracking to follow the relative motion of an object in the narrow field of view channel, the image system is aligned to the scene detail by mixed in symbols. The apparatus for performing the methods includes the tracker which when is activated by a control panel, simultaneously switches the detail selector from the video mixing means to the tracker. When fixing the tracked scene detail in a fixed position on the image portrayal device, the tracker is decoupled from the detail selector and a synchronization device is coupled to the tracker via the detailed selector.

An apparatus for implementing the method includes an imaging means with two optical channels having different fields of view at an image pick-up side, the imaging means being coupled to converter devices to convert picture signals on the two optical channels into TV video signals. The TV video signals on the two channels are supplied to a picture mixing device. A detail selector is provided to select a detail of the TV video signal of the narrow field of view channel and mix it into the TV video signal of the wide field of view channel in the picture mixing device. A single image portrayal device, or monitor, presents the mixed video signal in a visible form so that an overview scene from the wide field of view channel and a mixed in picture detail of the narrow field of view channel simultaneously appear thereon.

In particular embodiments, the converter devices are television cameras and, alternately, are field memories. The image system at the image pick-up side may also be composed of a dual channel camera fashioned with two optical systems having different magnifications and a common scan system. The imaging system is preferably arranged on a directional platform that is stabilized in two axes and is pivotable in azimuth and elevation. The image portrayal device is preferably composed of a single picture screen as a viewing means. The image portrayal device may also be composed of a head up display or of a helmet mounted display or a helmet mounted sight. The directional platform is preferably aligned in azimuth and elevation on the basis of a helmet mounted sight sight of the observer. In other words, the platform follows the motion of the observer's head.

The optical axis of the narrow field of view channel lies within the angular range of the wide field of view. In a preferred embodiment, the optical axis of the narrow field of view channel and of the wide field of view channels are aligned parallel to one another.

To keep the expense for the imaging system at the image pick-up side as low as possible, it is advantageous that the imaging system be composed of a dual channel camera that is fashioned with two optical systems having different magnifications and with a common scan system. However, it also possible to use two discrete, individual cameras synchronized to one another instead of a dual channel camera; this, however, makes the system more expensive.

At the image portrayal side, the image portrayal means is expediently composed of a viewing device having a single picture screen. However, it is particularly advantageous when the image portrayal means is composed of a head gear viewing means. In this case, the directional platform provided for the imaging system is aligned in azimuth and elevation by the helmet mounted sight of the observer, i.e. the infrared image system pivots in the same direction when the observer turns his head so that it looks in the same direction as the observer. It is also possible to align the directional platform of the imaging system with a higher ranking control means.

Although the present invention is particularly useful in infrared imaging systems, the principles embodied therein are applicable to visible light imaging systems, as well as imaging systems at other non-visible frequencies, such as radar and sonar.

DETAILED DESCRIPTION OF THE PREFERRED EMBODIMENTS

Figure 1:
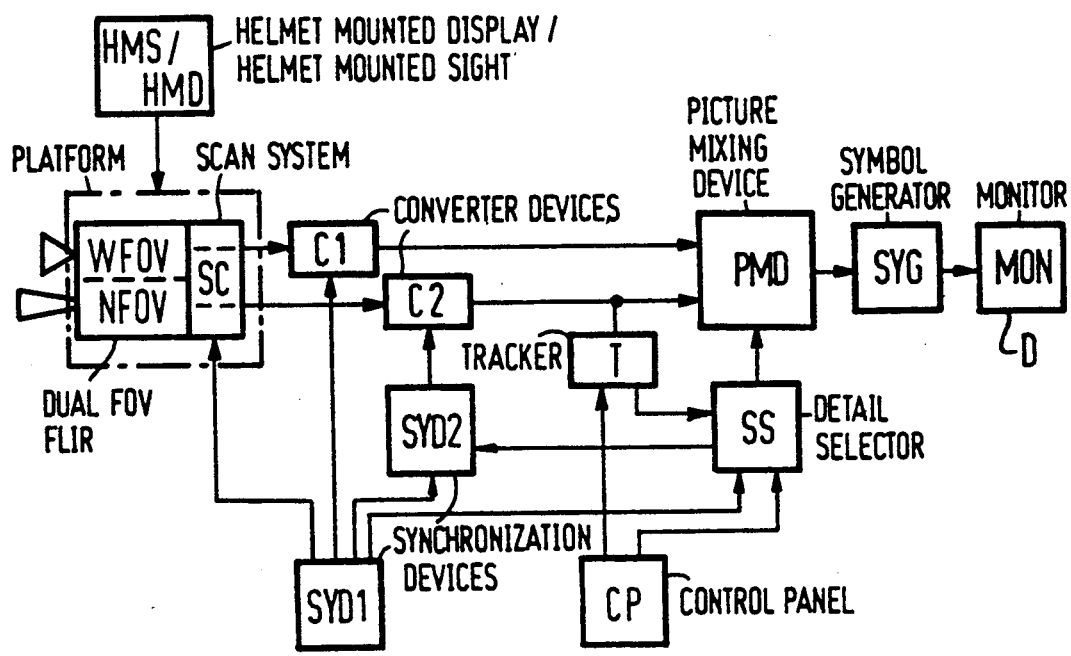
FIG. 1 is a circuit block diagram showing an embodiment of an apparatus for implementing the method of the present invention.

The method of the invention shall be set forth in greater detail with reference to an embodiment of an apparatus for implementing the method as shown in FIG. 1. The apparatus of FIG. 1 comprises, at an image pick-up side, an infrared image system FLIR (forward looking infrared). The imaging system FLIR is preferably composed of a dual channel camera having a dual field of view (FOV) that is mounted on a directional platform P which is stabilized in two axes and is pivotable in azimuth and elevation. The infrared image system FLIR comprises two optical channels having different fields of view, a first, wide field of view channel WFOV and a second, narrow field of view channel NFOV. In accordance therewith, the dual channel camera FLIR is fashioned with two optical systems having different magnifications, wherein the wide field of view camera WFOV covers, for example, 30° by 40° (vertical space by horizontal space) and wherein the narrow field of view camera NFOV covers an approximately 3° by 4° view (vertical space by horizontal space). The wide field of view channel WFOV thus generates an approximately 1:1 portrayal of a scene, whereas a ten-fold magnification is provided by the narrow field of view channel NFOV given the exemplary values. Different fields of view are, of course, possible. The optical axis of the narrow field of view channel NFOV preferably lies within the angular range of the wide field of view channel WFOV and, in particular, the axes thereof are preferably aligned parallel to one another. The dual channel camera FLIR also includes a common scan system SC for scanning the scene.

The disclosed system simultaneously observes a scene with both channels given the infrared image system FLIR or the dual field of view dual camera system. Full image information of both fields of view is simultaneously available at the outputs of the infrared image system FLIR. The infrared image signals generated by the infrared image system are first converted into TV video signals with the assistance of two converter devices C1 and C2. The TV video signals are synchronized with one another, in other words, edited in video-suited fashion, with the assistance of control signals that are generated in a first synchronization device SYD1. The TV video signals are then supplied to a picture mixing device PMD.

Only a portion of the TV video signal of the narrow field of view channel NFOV, which for example contains only a picture detail of the narrow field of view channel, is mixed into the TV video signal of the wide field of view channel WFOV by an operator such as the observer himself. In one example, the picture detail is a 1 by 1.5° view containing, for example, only a specific target object. The operator mixes the picture detail into the video signal using a control panel CP and a detail selector SS. The mixed video signal is subsequently portrayed at an image portrayal side in such fashion that an overview scene of the wide field of view channel WFOV and a mixed in image detail of the narrow field of view channel NFOV appear simultaneously in the portrayed image. The size and the position of the part to be mixed in, i.e. of the detail of the scene to be mixed in, is controlled by a signal generated by the detail selector SS.

A single image portrayal device D that, for example, is composed of a viewing means having a single picture screen, or monitor, MON is provided for displaying the mixed video signal at the image portrayal side. However, the image portrayal means can also be composed of a head up display HUD or of a helmet mounted display HMD or a helmet mounted sight HMS, whereby the directional platform P of the infrared image system FLIR in the latter instance is aligned in azimuth and elevation by the helmet mounted sight or helmet sight H of the observer. Such systems are commonly used in fighter aircraft and are known, for example, from U.S. Pat. No. 4,684,249.

In the signal path from the picture mixing device PMD to the image portrayal device D, a symbol for identifying the position of the illustrated picture detail and the wide field of view channel WFOV and/or suitable additional symbol signals, for example portraying operating conditions, reference axes, range, height or for the identification of scene details, are superimposed on the mixed video signal in a symbol generator SYG.

In addition to the first synchronization device SYD1, a further, second synchronization device SYD2 is also provided with whose assistance that portion of the TV video signal of the narrow field of view channel NFOV selected by the detail selector SS is electrically displaceable. Thus, the narrow field of view portion is mixed into the TV video signal of the wide field of view channel WFOV so that the picture detail of the narrow angle channel NFOV is portrayed in a pre-selected region of the image portrayal device.

The preferred embodiment of the present apparatus further contains a tracker T for tracking a prominent scene detail in the narrow field of view channel NFOV. The locking of the tracker T onto a scene detail ensues by aligning the infrared image system FLIR to the desired detail on the basis of the mixed in symbols. By engaging the "tracking" operating mode at the control panel CP, the tracker T is activated and the detail selector SS is simultaneously switched to the tracker T by the picture mixing device PMD. Henceforth, the track signals generated by the tracker T control the size and the position of the picture detail that is mixed in. Given relative movement of the tracked detail relative to the line of site of the narrow field of view channel NFOV, the picture detail follows the detail on the picture screen MON of the image portrayal device D within the possible portrayal range of the narrow field of view channel NFOV. In other words, the picture detail migrates on the picture screen MON.

By activating the second synchronization device device SYD2 via the detail selector SS proceeding from the control panel CP, it is possible to allow the tracked scene detail in the mixed in picture detail to appear in a fixed position on the picture screen MON. This occurs in such fashion that signals are generated in the control panel CP that decouple the tracker T from the detail selector SS and couple the synchronization device SYD2 to the tracker T. The detail selector SS controls the picture detail that is to be mixed in according to pre-programmed values. Via the second synchronization device SYD2, the tracker T now controls the synchronizing signals that the first synchronization device SYD1 supplied to the converter means C2 such that the tracked scene detail in the stationary picture detail appears on the image portrayal device D.

Figure 2:
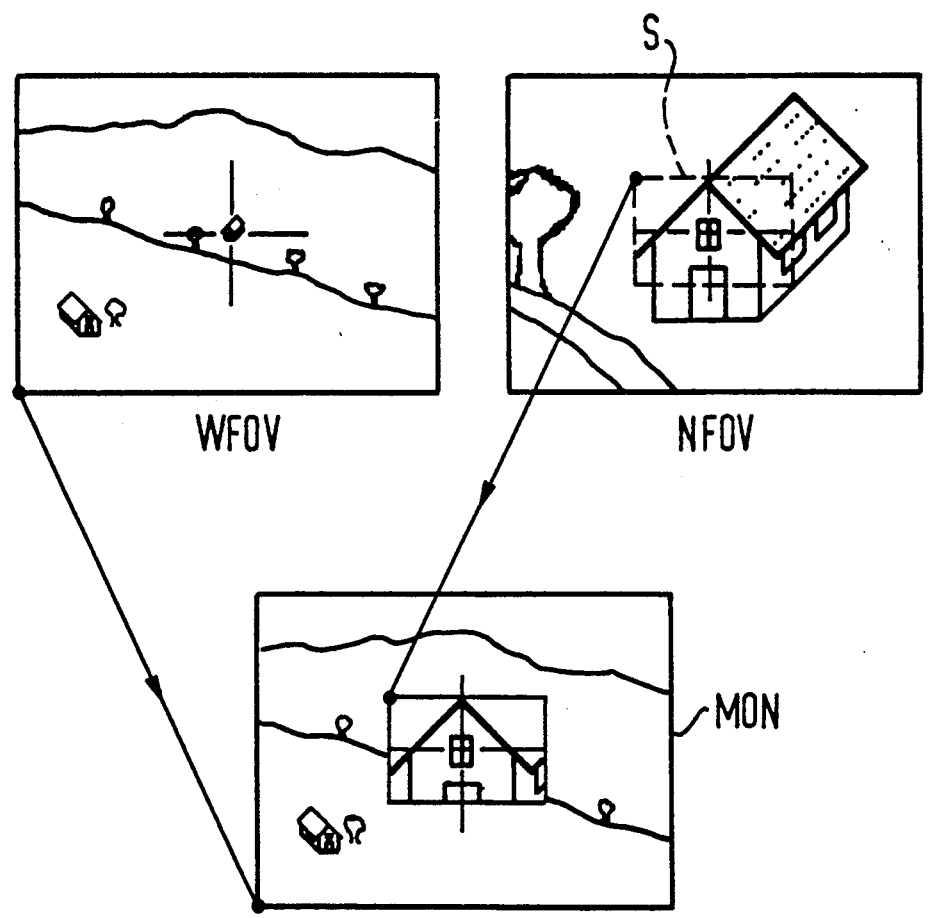
FIG. 2 is a schematic illustration at an image viewing side showing images from the two video channels and the mixed video signal.

Referring to FIG. 2, a scene is shown schematically as obtained by the wide field of view channel WFOV and a further scene is shown by the narrow field of view channel NFOV. A mixed image is formed from the two scenes into a third image wherein a picture detail of the narrow field of view channel NFOV identified by, for example, a rectangle symbol S is mixed into the picture of the wide field of view channel WFOV so that the location of the mixed in picture detail in the mixed picture portrayed on the picture screen MON corresponds to its relative position in the narrow field of view channel NFOV.

Figure 3:
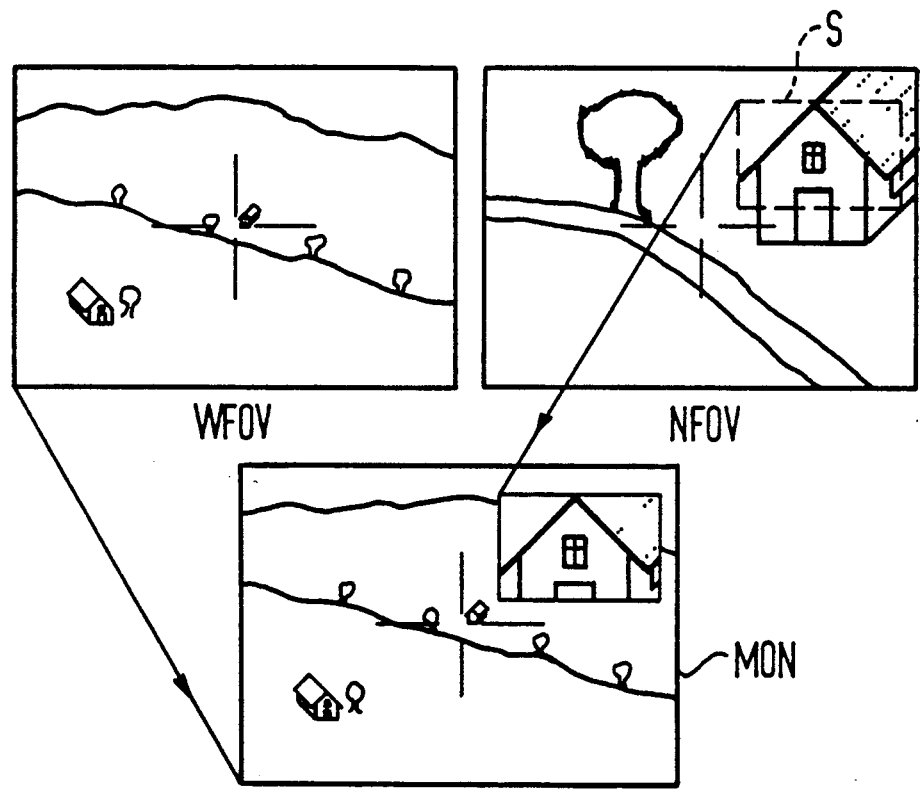
FIG 3 is a schematic illustration similar to FIG. 2 showing a further embodiment of the invention.

In a further embodiment, FIG. 3 shows a portrayal provided by a tracking operating mode. The picture detail of the narrow field of view channel NFOV is again identified by a symbol S and is mixed into the picture of the wide field of view channel WFOV such that the location of the mixed in picture detail of the mixed picture portrayed on the picture screen MON is situated roughly in the upper right hand quadrant. Thus, the specific object of interest can be seen both in the 1:1 portrayal of the wide field of view channel WFOV and the overview scene as well as in detail in the enlarged picture detail of the narrow field of view channel NFOV.

Thus, a method and apparatus of the invention are shown for observing a scene with an image system, and particularly an infrared image system, wherein the two optical channels having different fields of view are mixed into and portrayed on a single image portrayal device. The picture detail can follow the relative motion of an object on the basis of a tracking event. This provides for easy one person operation.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonable and properly come within the scope of our contribution to the art.

We claim as our invention:

1. A method for observing a scene, comprising the steps of:

directing an image pick-up side of an infrared imaging system having two optical channels with different fields of view at a scene to be observed to obtain a picture signal of the scene to be observed having a wide field of view and having a narrow field of view;

converting said picture signals of said two optical channels into two television video signals through two converter devices;

synchronizing said two television video signals to one another with a first synchronization device;

supplying said two television video signals to a picture mixing device;

selecting only a detail of said television video signal of said narrow field of view by a detail selector;

mixing said detail with said television video signal of said wide field of view in said picture mixing device to form a mixed video signal; and portraying said mixed video signal on a single image portrayal device in such fashion that an overview of the scene to be observed from the wide field of view channel appears simultaneously with a mixed-in picture detail of said narrow field of view channel in a portrayed picture.

2. A method for observing a scene, comprising the steps of:

directing an image pick-up side of an infrared imaging system having two optical channels with different fields of view at a scene to be observed to obtain a picture signal of the scene to be observed having a wide field of view and having a narrow field of view;

converting said picture signals of said two optical channels into two television video signals through two converter devices;

synchronizing said two television video signals to one another with a first synchronization device;

supplying said two television video signals to a picture mixing device;

selecting a part of said television video signal from said optical channel of said narrow field of view by a detail selector;

mixing said part of said narrow field of view signal with said television video signal of said wide field of view in said picture mixing device to form a mixed video signal;

portraying said mixed video signal on a single image portrayal device in such fashion that an overview of the scene to be observed from the wide field of view channel appears simultaneously with a mixed-in picture detail of said narrow field of view channel in a portrayed picture;

supplying said mixed video signal to a symbol generator before said step of portraying;

superimposing a symbol in a wide field of view portion of said mixed video signal to identify a position of a portrayed picture detail.

3. A method as claimed in claim 2, further comprising the step of:

superimposing a symbol on said mixed video signal wherein said symbol is selected from the group consisting of; operating conditions symbols, reference axes symbols, range symbols, height symbols and scene detail symbols.

4. A method for observing a scene, comprising the steps of:

directing an image pick-up side of an infrared imaging system having two optical channels with different fields of view at a scene to be observed to obtain a picture signal of the scene to be observed having a wide field of view and having a narrow field of view;

converting said picture signals of said two optical channels into two television video signals through two converter devices;

synchronizing said two television video signals to one another with a first synchronization device;

supplying said two television video signals to a picture mixing device;

selecting a part of said television video signal from said optical channel of said narrow field of view by a detail selector;

mixing said part of said narrow field of view signal with said television video signal of said wide field of view in said picture mixing device to form a mixed video signal;

portraying said mixed video signal on a single image portrayal device in such fashion that an overview of the scene to be observed from the wide field of view channel appears simultaneously with a mixed-in picture detail of said narrow field of view channel in a portrayed picture;

mixing a part of said video signal of said narrow field of view channel selected by said detail selector into said video signal of said wide field of view channel with a second synchronization device so that a picture detail of said narrow field of view channel is portrayed in a preselected region of said image portrayal device.

5. A method for observing a scene, comprising the steps of:

directing an image pick-up side of an infrared imaging system having two optical channels with different fields of view at a scene to be observed to obtain a picture signal of the scene to be observed having a wide field of view and having a narrow field of view;

converting said picture signals of said two optical channels into two television video signals through two converter devices;

synchronizing said two television video signals to one another with a first synchronization device;

supplying said two television video signals to a picture mixing device;

selecting a part of said television video signal from said optical channel of said narrow field of view by a detail selector;

mixing said part of said narrow field of view signal with said television video signal of said wide field of view in said picture mixing device to form a mixed video signal;

portraying said mixed video signal on a single image portrayal device in such fashion that an overview of the scene to be observed from the wide field of view channel appears simultaneously with a mixed-in picture detail of said narrow field of view channel in a portrayed picture;

tracking a portrayed picture detail of said narrow field of view channel to follow relative motion of an object in said narrow field of view by a tracker.

6. A method as claimed in claim 5, wherein said step of tracking includes aligning said imaging system to a scene detail by mixed in symbols to lock said tracker onto said scene detail.

7. A method as claimed in claim 5, further comprising the steps of:

switching said detail selector from said picture mixing device onto said tracker upon activation of said tracker by a control panel.

8. A method as claimed in claim 7, further comprising the steps of:

decoupling said tracker from said detail selector proceeding from said control panel; and coupling said second synchronization device to said tracker via said detail selector for fixing a tracked scene detail in a fixed position on said image portrayal device.

9. An apparatus for observing a scene, comprising:

an image system having two optical channels with different fields of view, said two channels being a narrow field of view channel and a wide field of view channel;

two converter means for converting picture signals of said two channels into two corresponding video signals being a narrow field of view video signal and a wide field of view video signal;

a synchronization means for synchronization of said two video signals;

a detail selector means for selecting a part of said narrow field of view signal;

a picture mixing means connected to an output of said synchronization means and to said detail selector means for mixing said part of said narrow field of view signal into said wide field of view signal to form a mixed video signal;

a single image portraYal device connected to receive said mixed video signal so that an overview scene of said wide field of view channel and a mixed up picture detail of the narrow field of view channel appear simultaneously in a portrayed picture.

10. An apparatus as claimed in claim 9, wherein said two converter means are television cameras.

11. An apparatus as claimed in claim 9, wherein said two converter means are field memories.

12. An apparatus as claimed in claim 9, wherein said image system is composed of a dual channel camera having two optical systems of different magnification and having a common scan system.

13. An apparatus as claimed in claim 9, wherein said image portrayal device includes a single picture screen.

14. An apparatus as claimed in claim 9, wherein said image portrayal device is a head-up display.

15. An apparatus as claimed in claim 9, wherein said image portrayal device is a helmet mounted display or helmet mounted sight.

16. An apparatus as claimed in claim 9, further comprising:

a directional platform for said image system, said directional platform being stabilized in two axes; and means for pivoting said directional platform in azimuth and elevation.

17. An apparatus as claimed in claim 16, further comprising:

means for aligning said directional platform in azimuth and elevation on the basis of a helmet mounted sight of the observer.

18. An apparatus as claimed in claim 9, wherein an optical axis of the narrow field of view channel lies within an angular range of the wide field of view channel.

19. An apparatus as claimed in claim 18, wherein said optical axis of said narrow field of view channel is aligned parallel to an optical axis of said wide field of view channel.

* * * * *